United States Patent [19]
Baran et al.

[11] Patent Number: 4,517,418
[45] Date of Patent: May 14, 1985

[54] PORTABLE STEREOPHONE

[75] Inventors: Michael S. Baran, St. Francis; Joseph C. Besasie, Milwaukee; Wayne L. Warren, Port Washington; Allen W. Montgomery, Milwaukee, all of Wis.

[73] Assignee: Koss Corporation, Milwaukee, Wis.

[21] Appl. No.: 549,667

[22] Filed: Nov. 7, 1983

[51] Int. Cl.[3] .......................... H04M 1/05; H04R 1/10
[52] U.S. Cl. .................................... 179/156 R; 2/209; 179/182 R; 381/25
[58] Field of Search ........... 179/156 R, 156 A, 182 R; 381/25; 2/209

[56] References Cited

U.S. PATENT DOCUMENTS 1,087,704 2/1914 Adams-Randall .............. 179/156 R
1,133,833 3/1915 Adams-Randall .............. 179/156 R
4,404,434 9/1983 Pelt et al. ............................ 179/156

FOREIGN PATENT DOCUMENTS 2229965 12/1972 Fed. Rep. of Germany ... 179/156 R

*Primary Examiner*—Gene Z. Rubinson
*Assistant Examiner*—Danita R. Byrd
*Attorney, Agent, or Firm*—Barry E. Sammons

[57] ABSTRACT

A stereophone includes a pair of temporal pads which connect to a headband and engage the user's head above each ear. A support arm pivotally connects to each temporal pad and supports an ear cup over the user's ear. A locking mechanism enables the support arm to be positioned in a number of operating positions or swung to a transport position.

2 Claims, 9 Drawing Figures

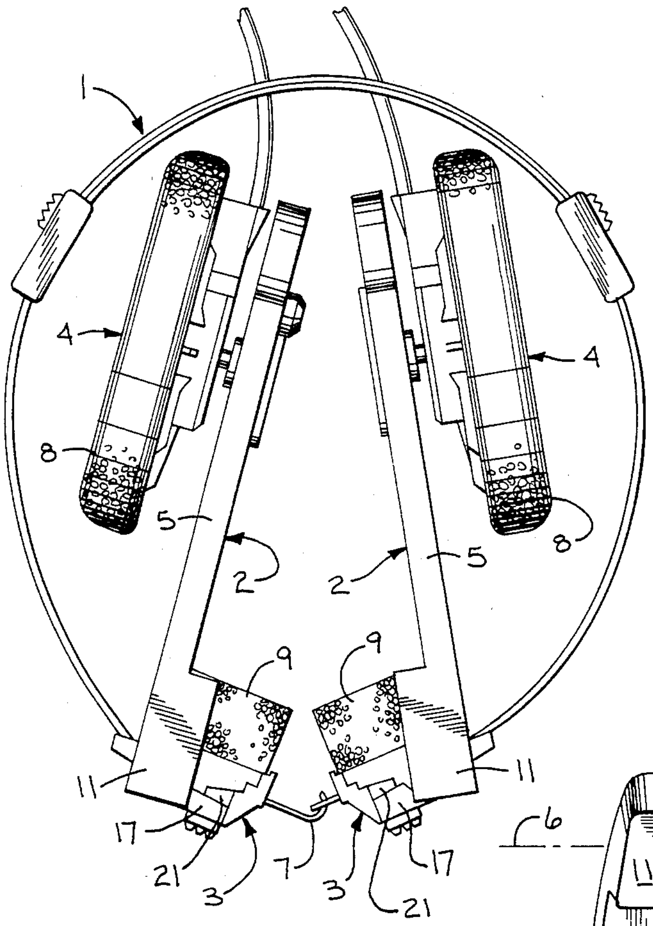
FIG. 1
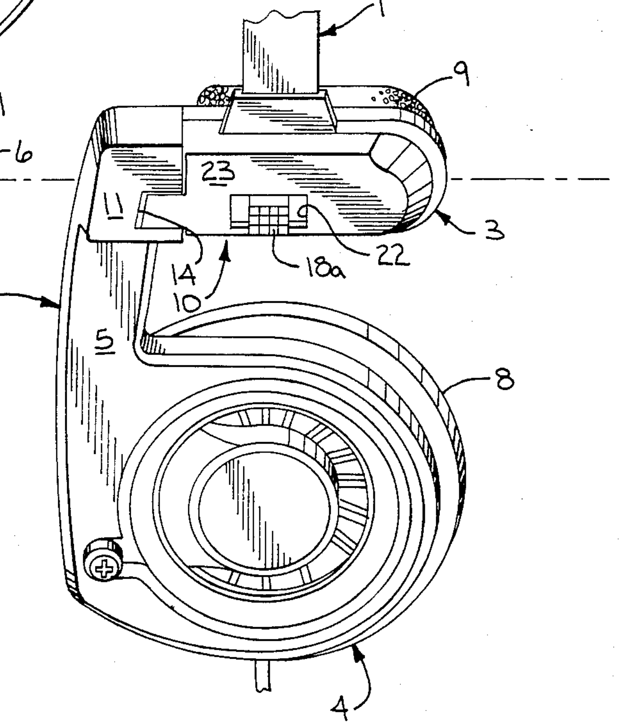
FIG. 2
FIG. 3
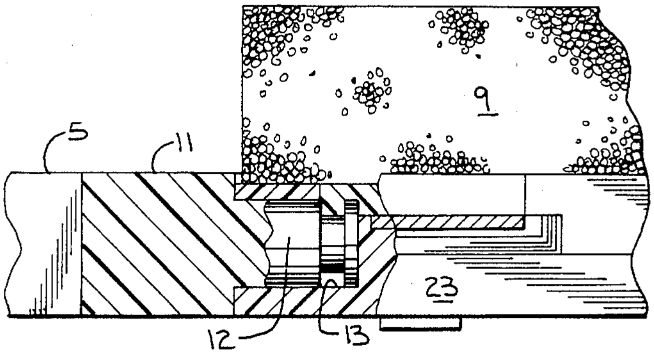

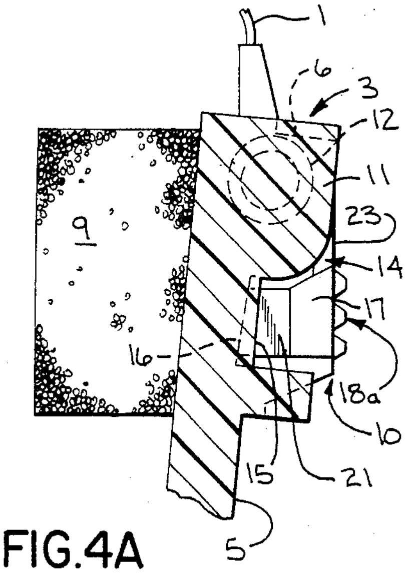
FIG.4A
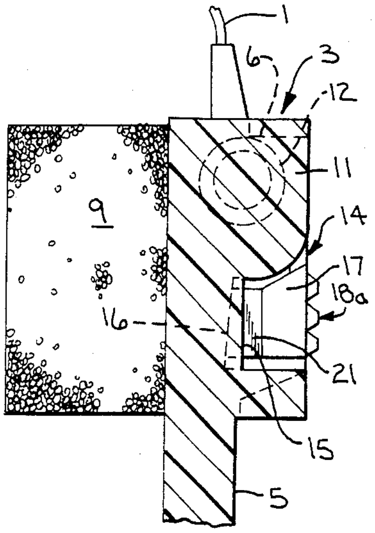
FIG.4B
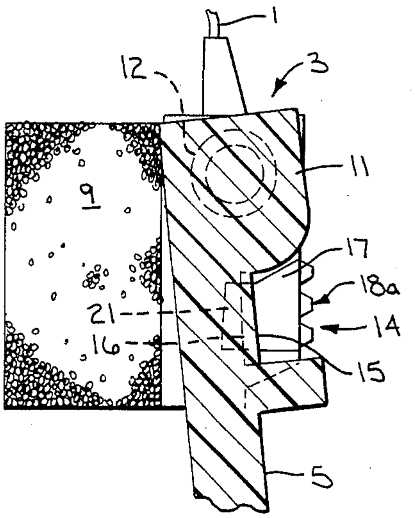
FIG.4C
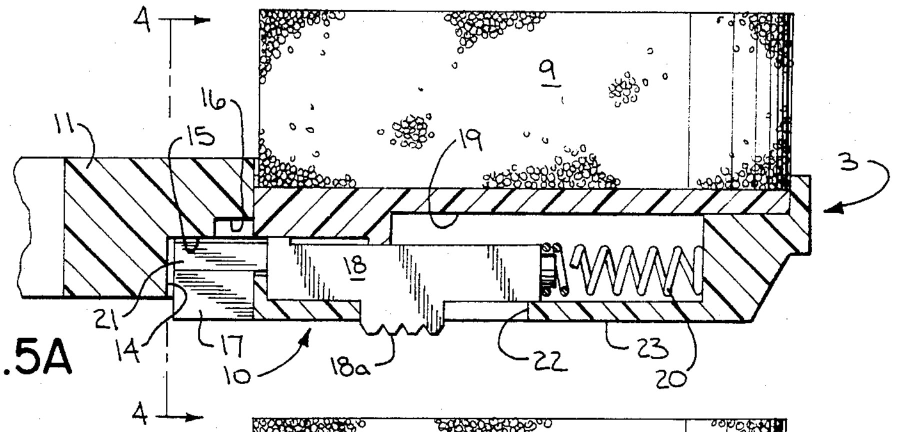
FIG.5A
FIG.5B
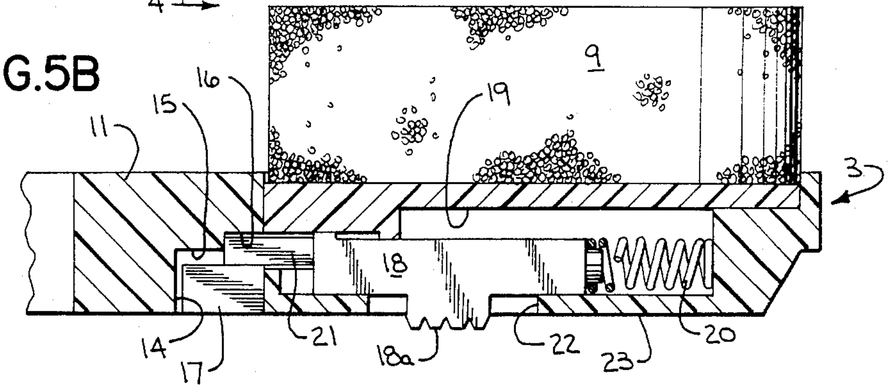
FIG.5C
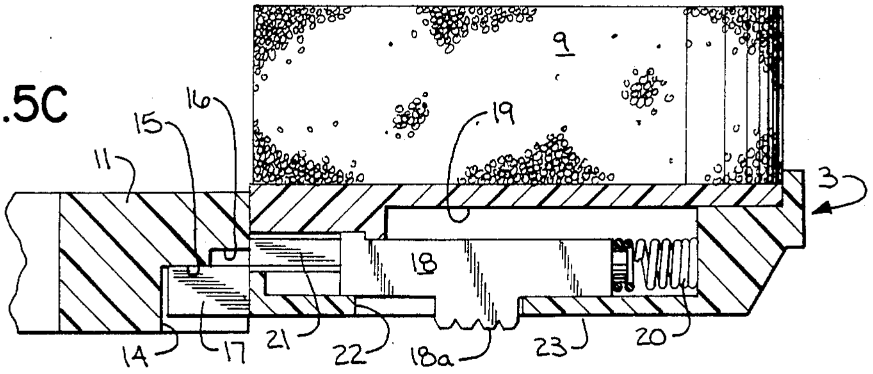

PORTABLE STEREOPHONE

BACKGROUND OF THE INVENTION

The field of the invention is stereophones used for the reproduction of high fidelity program material.

High quality stereophones are manufactured in many shapes and sizes. Most of them, however, include a pair of acoustic transducers which are held over the user's ears by a supporting structure which also encloses the acoustic transducer and provides an aesthetically pleasing appearance. In many stereophones this takes the form of a pair of ear cup assemblies which are held in place over the user's ears by a headband.

Nearly all stereophones are intended for use in the home or business where the user is relatively inactive. More recently, however, high quality sound equipment has been miniaturized to the point where it can be carried by the user and operated while the user is actively engaged in sport or exercise.

A stereophone which is particularly well suited for such use in disclosed in U.S. Pat. No. 4,404,434 entitled "Collapsible Stereophone". This prior stereophone includes a flexible headband which supports a cup assembly at each of its ends. These cup assemblies may be pivoted to a compact, transport position or extended to an operating position in which the cup assemblies are placed over the user's ears. While the length of the flexible headband may be adjusted, there is no means for adjusting each cup assembly about its pivot axis to accommodate different users.

SUMMARY OF THE INVENTION

The present invention relates to a stereophone which can be collapsed when not in use and which can be unfolded and adjusted to comfortably fit a wide variety of users. More particularly, the present invention includes a cup assembly having a temporal pad which connects to the end of a headband, an ear cup which supports an acoustic transducer, and a support arm which extends upward from the ear cup and is pivotally connected to the temporal pad. The pivotal connection of the support arm to the temporal pad enables the stereophone to be collapsed into a transport position, and when in use, it enables the position of the ear cup to be adjusted relative to the temporal pad.

A general object of the invention is to provide stereophones which may be adjusted to fit a wide variety of users. By pivoting the ear cup further away from the user's ear, the pressure needed to retain the stereophone in place is shifted to the temporal pad. This configuration is particularly comfortable since the temporal pad engages the user's head in a relatively insensitive area above the ear. In addition, the stereophone may be retained quite securely to the head when adjusted in this manner, thus allowing its comfortable use during activities.

On the other hand, the sound quality of the stereophone may be enhanced by pivoting the ear cup inward toward the user's ear. This configuration shifts pressure from the temporal pad to the ear cup which rests against the ear. This increased pressure on the ear improves the acoustic coupling with the ear and significantly enhances the low frequency response of the stereophone.

Another object of the invention is to provide a pivotal adjustment which is easy to use. The ear cup is swung down from the transport position and a slide locking mechanism is operated to lock the pivotal support arm in one of three operating positions. The slide locking mechanism requires few parts and is light in weight.

The foregoing and other objects and advantages of the invention will appear from the following description. In the description, reference is made to the accompanying drawings which form a part thereof, and in which there is shown by way of illustration a preferred embodiment of the invention. Such embodiment does not necessarily represent the full scope of the invention, however, and reference is made therefore to the claims herein for interpreting the scope of the invention.

BRIEF DESCRIPTION OF THE DRAWINGS

FIG. 1 is an elevation view of the invented stereophone in its transport position;

FIG. 2 is a side elevation view of a cup assembly which forms part of the stereophone of FIG. 1;

FIG. 3 is a partial top view with parts cut away of the cup assembly of FIG. 2;

FIGS. 4A-4C are partial front elevation views of the cup assembly of FIG. 2 with parts cut away; and FIGS. 5A-5C are partial top views of the cup assembly of FIG. 2 with parts cut away.

DESCRIPTION OF THE PREFERRED EMBODIMENT

Referring particularly to FIGS. 1 and 2, the stereophone includes a flexible headband 1 which supports cup assemblies 2 at its ends. Each cup assembly includes a temporal pad portion 3 which rigidly connects to the headband 1, and an ear cup portion 4 which is positioned beneath the temporal pad 3. The ear cup 4 is connected to the forward end of the temporal pad 3 by a support arm 5 which is attached to the ear cup 4 and which extends upward from the forward edge of the ear cup 4. The upper end of the support arm 5 is pivotally connected to the forward end of the temporal pad 3, and as will be explained in more detail below, this pivotal connection enables the support arm 5 and attached ear cup 4 to be swung about a pivot axis 6 in the plane of the headband 1. As shown in FIG. 1, the support arms 5 may be swung inward and upward to a transport position in which the ear cups 4 are tightly enclosed by the headband 1 and the temporal pads 3 are locked together by a fastening mechanism 7.

Referring still to FIGS. 1 and 2, when the stereophone is unfolded into its operating position the ear cups 4 extend downward from the ends of the headband 1 and rest directly on the user's ears. A plastic foam cushion 8 is affixed to the ear cup 4 and it not only improves the comfort of the stereophone, but it provides a partial acoustic seal for the sound which reaches the user's ear from the acoustic transducer inside the ear cup 4 (not shown in the drawings). A pad 9 also made of plastic foam material is bonded to the inner surface of the temporal pad 3. The pad 9 rests against the user's head, immediately above the ear, and it imparts a substantial portion of the clamping force which is required to retain the stereophones in place when the user is physically active. As with most stereophones, the magnitude of the clamping force can be changed by adjusting the length and the curvature of the headboard 1. In contrast to prior stereophones, however, the present invention enables the distribution of the clamping force to be adjusted between the temporal pad 9 and the ear cushion 8.

Referring particularly to FIGS. 3–5, this adjustment is provided by a slide locking mechanism 10 associated with the pivotal connection of the support arm 5 to the temporal pad 3. The upper end of the support arm 5 is enlarged to form a header 11 which has an integrally molded pivot pin 12 that extends rearward into a mating cavity 13 formed in the temporal pad 3. A substantially rectangular-shaped cavity 14 is also formed in the header 11, beneath the pivot pin 12, and this cavity 14 defines a pair of stepped bearing surfaces 15 and 16 which are directed outward. A tab 17 is integrally formed on the forward end of the temporal pad 3 and it extends into the cavity 14 when the stereophone is in its unfolded, operating position.

The slide locking mechanism 10 includes a slider 18 which is entrapped in an elongated cavity 19 formed in the temporal pad 3. A bias spring 20 engages the back end of the slider 18 and drives it forward in the cavity 19. A wedge 21 is formed on the forward end of the slider 18, and it may extend forward into the rectangular cavity 14 of the header 11 where it engages one of the bearing surfaces 15 or 16. The slider 18 has a knurled button 18*a* which extends through a slot 22 in the outer wall 23 of the temporal pad 3, and the user may employ this button 18*a* to translate the slider 18 backwards against the force of the bias spring 20.

When the stereophone is unfolded from its transport position the slider 18 is biased all the way forward, and the wedge 21 engages the bearing surface 15 as shown in FIGS. 4A and 5A. In this first operating position, the support arm 5 angles inward toward the user's head and a majority of the clamping pressure is shifted to the ear cushions 8. If the slider 18 is translated rearward a short distance, the wedge 21 is retracted part way and the support arm 5 is allowed to swing further outward to a second operating position shown in FIGS. 4B and 5B. In this second operating position the wedge 21 engages the bearing surface 16 and the support arm 5 extends straight downward to distribute the clamping force substantially equally between the ear cushion 8 and the temporal pad 9. If the slider 18 is translated further to back as shown in FIGS. 4C and 5C, the wedge 21 is fully retracted inside the cavity 19. In this third operating position the inner surface of the tab 17 engages the bearing surface 15 and the support arm 5 is allowed to swing further outward from the user's head. In this position a majority of the clamping force is transferred to the temporal pad 9 to minimize the force directly on the ear and to maximize comfort.

It should be apparent to those skilled in the art that numerous variations can be made to the preferred embodiment disclosed herein without departing from the spirit of the invention which is defined in the followng claims.

We claim:

1. In a stereophone having a headband with cup assemblies connected to each end of the headband, and wherein each cup assembly comprises:

(a) a temporal pad which connects to the headband and which engages the user's head above the ear when the stereophones are in use;

(b) a support arm pivotally connected to the temporal pad and extending downward therefrom when the stereophones are in use;

(c) an ear cup connected to the support arm and containing an acoustic transducer which is positioned over the user's ear when the stereophones are in use;

(d) a slider mounted in the temporal pad and having a wedge which extends out the end of the temporal pad to engage the support arm when the slider is in one position and which is retracted into the temporal pad when the slider is in a second position;

(e) a plurality of bearing surfaces formed on the support arm adjacent is pivotal connection with the temporal pad, each bearing surface being positioned to engage the slider wedge and lock the support arm in a different orientation; and wherein the headband provides a clamping force which retains the stereophones to the user's head when in use, and the clamping force may be distributed between the temporal pads and the ear cups by adjusting the orientation of the support arms about their pivotal connections with the temporal pads.

2. The stereophone as recited in claim 1 in which a bias spring is disposed in the temporal pad and engages the slider to urge the slider into said one position, and a button connects to the slider and extends through a slot in the temporal pad to enable the user to move the slider to said second position.

* * * * *